United States Patent
Fu et al.

(10) Patent No.: US 12,069,501 B2
(45) Date of Patent: Aug. 20, 2024

(54) INFORMATION REPORTING METHOD AND APPARATUS, TERMINAL AND NETWORK-SIDE DEVICE

(71) Applicant: DATANG MOBILE COMMUNICATIONS EQUIPMENT CO., LTD., Beijing (CN)

(72) Inventors: Jing Fu, Beijing (CN); Jing Liang, Beijing (CN); Ying Wang, Beijing (CN); Aijuan Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 319 days.

(21) Appl. No.: 17/427,615

(22) PCT Filed: Jan. 22, 2020

(86) PCT No.: PCT/CN2020/073768
§ 371 (c)(1),
(2) Date: Jul. 30, 2021

(87) PCT Pub. No.: WO2020/156422
PCT Pub. Date: Aug. 6, 2020

(65) Prior Publication Data
US 2022/0104054 A1   Mar. 31, 2022

(30) Foreign Application Priority Data
Feb. 1, 2019 (CN) .......................... 201910105159.2

(51) Int. Cl.
H04W 24/10   (2009.01)
H04W 24/04   (2009.01)

(52) U.S. Cl.
CPC .......... *H04W 24/10* (2013.01); *H04W 24/04* (2013.01)

(58) Field of Classification Search
CPC . H04W 24/04; H04W 24/10; H04W 36/0069; H04W 36/0079; H04W 36/0085; H04W 76/15; H04W 76/18; H04W 76/19
See application file for complete search history.

(56) References Cited

U.S. PATENT DOCUMENTS

2015/0133122 A1   5/2015   Chen
2015/0180706 A1   6/2015   Uchino et al.
(Continued)

FOREIGN PATENT DOCUMENTS

CN   107690154 A   2/2018
CN   108781376 A   11/2018
(Continued)

OTHER PUBLICATIONS

Supplementary European Search Report for European Patent Application 20748894.1 issued on Feb. 24, 2022.
(Continued)

*Primary Examiner* — Siu M Lee
(74) *Attorney, Agent, or Firm* — Ladas & Parry, LLP

(57) ABSTRACT

An information reporting method and apparatus, terminal and network-side device are provided. One implementation of the information reporting method is applied to a terminal and includes: reporting, in a case that that an abnormality is detected in a master cell group (MCG), MCG abnormality information via a signaling radio bearer 3 (SRB3).

19 Claims, 3 Drawing Sheets

Reporting, in a case that an abnormality is detected in a master cell group (MCG), MCG abnormality information via a signaling radio bearer 3 (SRB3) — S110

(56) References Cited

U.S. PATENT DOCUMENTS

| | | | | |
|---|---|---|---|---|
| 2017/0367047 | A1* | 12/2017 | Fujishiro | H04W 8/22 |
| 2019/0037630 | A1 | 1/2019 | Zhang et al. | |
| 2019/0045568 | A1* | 2/2019 | Palat | H04W 76/27 |
| 2019/0182883 | A1 | 6/2019 | He et al. | |
| 2019/0342148 | A1 | 11/2019 | Hong et al. | |
| 2020/0059395 | A1* | 2/2020 | Chen | H04W 28/082 |
| 2020/0205003 | A1* | 6/2020 | Ingale | H04W 12/04 |
| 2021/0068186 | A1* | 3/2021 | Wu | H04W 76/18 |
| 2021/0112617 | A1* | 4/2021 | Zhang | H04W 76/15 |
| 2021/0250789 | A1* | 8/2021 | Wu | H04W 76/12 |
| 2022/0007214 | A1* | 1/2022 | Zhang | H04W 24/10 |
| 2022/0007257 | A1* | 1/2022 | Wang | H04W 36/305 |

FOREIGN PATENT DOCUMENTS

| | | |
|---|---|---|
| CN | 108924866 A | 11/2018 |
| CN | 109076383 A | 12/2018 |
| EP | 3902310 A1 | 10/2021 |

OTHER PUBLICATIONS

"MCG failure handling in case of NE-DC(TP to 37.340)" 3GPP TSG-RAN WG2#AJ1807, Tdoc R2-1809949, Montreal, Canada, Jul. 2-6, 2018, (Resubmission of R2-1807079), Agenda Item: 10.2.6, Source: Ericsson.

"CG failure handling for MR-DC" 3GPP TSG-RAN WG2 Meeting #103bis, R2-1813841, Chengdu, China, Oct. 8-12, 2018, Source: CATT, Agenda ItemL 10.2.1.

"Fast MCG recovery via SRB3" 3GPP TSG-RAN WG2#106, R2-1905995, Reno, USA, May 13-17, 2019, Agenda item: 11.10.5, Source: Ericcson.

LG Electronics Inc., "Support of reliable RRC connection", R2-168422, 3GPP TSG-RAN WG2 #96, Reno, USA, Aug. 14-18, 2016, all pages.

Ericsson, "RLM and RLF in case of LTE-NR tight interworking", Tdoc R2-1700918, 3GPP TSG-RAN WG2 #97, Athens, Greece, Feb. 13-17, 2017, all pages.

LG Electronics Inc., "Supplementary SRB in MCG failure for NR", R2-1701639, 3GPP TSG-RAN WG2 #97, Athens, Greece, Feb. 13-17, 2017, all pages.

Second Office Action and search report from CN app. No. 201910105159.2, dated Dec. 6, 2021, with English translation from Global Dossier, all pages.

International Search Report from PCT/CN2020/073768, dated Apr. 14, 2020, with English translation from WIPO, all pages.

Written Opinion of the International Searching Authority from PCT/CN2020/073768, dated Apr. 14, 2020, with English translation from WIPO, all pages.

International Preliminary Report on Patentability from PCT/CN2020/073768, dated Jul. 27, 2021, with English translation from WIPO, all pages.

Vivo, "Report of SCell-failure of PDCP duplication", R2-1710930, 3GPP TSG-RAN WG2 Meeting #99bis, Prague, Czech Republic, Oct. 9-13, 2017, all pages.

First Office Action and Search Report from CN app. No. 201910105159.2, dated May 7, 2021, with English translation from Global Dossier, all pages.

Office action from the corresponding South Korean Patent Application No. 10-2021-7027058 dated Sep. 22, 2023, and its English translation.

Ericsson, "MCG failure handling in case of NE-DC and NR-DC," 3GPP TSG-RAN WG2 Meeting #103bis, R2-1814559, Sep. 27, 2018, Chengdu, China, Oct. 8-12, 2018.

Ericsson, "MCG failure handling in case of NE-DC and NN-DC (TP to 37.340)," 3GPP TSG-RAN WG2 Meeting #103, R2-1812017, Aug. 9, 2018, Gothenburg, Sweden, Aug. 20-24, 2018.

Office action from corresponding European Patent Application No. 20748894.1 dated Apr. 4, 2024.

Samsung: "SRB split and duplication for LTE-NR interworking". 3GPP Draft; R2-1703064_SRB Split and Duplication_R2, 3rd Generation Partnership Project (3GPP), Mobile Competence Centre; 650, Route Des Lucioles; F-06921 Sophia-Antipolis Cedex; France, vol. RAN WG2. No. Spokane, USA; Apr. 3, 2017-Apr. 7, 2017 Apr. 3, 2017 (Apr. 3, 2017), XP051245004.

Rapporteur (ZTE Corporation): "Agreements for MR-DC with 5GC", 3GPP Draft; 37340_CR0073R4 (REL-15)_R2-1819036 37340CR0073R4—Agreements for MR-DC@5GC, 3rd Generation Partnership Project (3GPP), Mobile Competence Centre; 650, Route Des Lucioles ; F-06921 Sophia-, vol. RAN WG2, No. Spokane, USA; Nov. 12, 2018-Nov. 16, 2018, Dec. 9, 2018 (Dec. 9, 2018), XP051553640.

* cited by examiner

Reporting, in a case that an abnormality is detected in a master cell group (MCG), MCG abnormality information via a signaling radio bearer 3 (SRB3) — S110

Fig.1

Receiving master cell group (MCG) abnormality information reported by the terminal via a signaling radio bearer 3 (SRB3) — S210

Fig.2

Receiving an MCG abnormality notification message, sent by an SCG of the terminal, indicating that the MCG is abnormal — S310

Fig.3

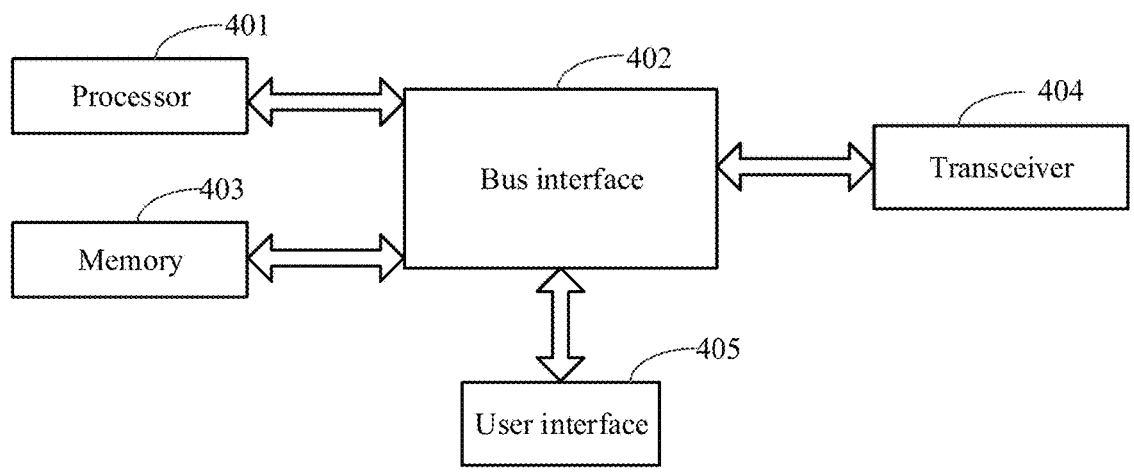

Fig.4

INFORMATION REPORTING METHOD AND APPARATUS, TERMINAL AND NETWORK-SIDE DEVICE

CROSS REFERENCE TO RELATED APPLICATIONS

This application is a U.S. national phase application of a PCT Application No. PCT/CN2020/073768 filed on Jan. 22, 2020, which claims priority to Chinese patent application No. 201910105159.2 filed in China on Feb. 1, 2019, the disclosures of which are incorporated in their entireties by reference herein.

TECHNICAL FIELD

The present disclosure relates to the field of radio technologies, and in particular, relates to an information reporting method and apparatus, terminal, and network-side device.

BACKGROUND

A master cell group (MCG) and one or more secondary cell groups (SCG) are usually included in a dual connectivity (DC) architecture. In the related art, a scenario of the dual connectivity architecture includes one MCG connected to multiple SCGs, and radio resource control (RRC) signaling is transmitted via a signaling radio bearer (SRB) 1 or an SRB2 after MCG side security is activated.

Four types of signaling radio bearers are defined in a NR system, namely SRB0, SRB1, SRB2 and SRB3. Purposes thereof are described as follow.

The SRB0 is used to carry RRC messages on a common control channel (CCCH), and these RRC messages are used in an RRC connection establishment procedure, an RRC connection recovery procedure or an RRC connection reestablishment procedure.

The SRB1 is used to carry RRC messages on a dedicated control channel (DCCH), and the SRB1 may also be used to carry a non-access stratum (NAS) message before the SRB2 is established.

The SRB2 is used to carry NAS messages on the DCCH, the SRB2 has a lower priority than the SRB1, and the SRB2 may be established and used by a network only after the security is activated.

The SRB3 is used for direct RRC message interaction between the SCG and UE in a DC scenario, and may carry specific RRC messages on the DCCH, such as a reconfiguration message, a measurement report, etc.

In a new radio (NR) system, when an MCG abnormality is detected and NR security is activated, the user equipment (UE) triggers an RRC reestablishment procedure. The RRC connection reestablishment procedure is divided into two phases: a preparation phase and an implementation phase. During the preparation phase, the UE performs a cell selection procedure to attempt to find a suitable NR cell, and the UE directly enters an idle state if no suitable NR cell is found within a given time. During the implementation phase, a successful RRC connection reestablishment procedure would involve 3 handshakes between the UE and the network. The UE recovers the SRB1 through this procedure, and recovers a data radio bearer (DRB), an SCG configuration and the like based on an RRC reconfiguration message sent by the network side. It may be seen that, the RRC reestablishment procedure causes a transmission interruption not only on the MCG side, but also on the SCG side.

SUMMARY

The purpose of the present disclosure is to provide an information reporting method and apparatus, terminal, and network-side device, so as to reduce interruptions caused by MCG abnormalities.

An embodiment of the present disclosure provides an information reporting method, performed by a terminal, including: reporting, in a case that an abnormality is detected in a master cell group (MCG), MCG abnormality information via a signaling radio bearer 3 (SRB3).

An embodiment of the present disclosure further provides an information reporting method, performed by a network-side device which belongs to a secondary cell group (SCG) of a terminal, including: receiving master cell group (MCG) abnormality information reported by the terminal via a signaling radio bearer 3 (SRB3).

An embodiment of the present disclosure further provides an information reporting method, performed by a network-side device which belongs to a master cell group (MCG) of a terminal, including: receiving an MCG abnormality notification message, sent by an SCG of the terminal, indicating that the MCG is abnormal.

An embodiment of the present disclosure further provides a terminal including: a transceiver, a memory, a processor and a program stored in the memory and executable by the processor; where the processor is configured to: report, in a case that an abnormality is detected in a master cell group (MCG), MCG abnormality information via a signaling radio bearer 3 (SRB3).

An embodiment of the present disclosure further provides a network-side device, where the network-side device belongs to an SCG of a terminal, and the network-side device includes: a transceiver, a memory, a processor and a program stored in the memory and executable by the processor; where the processor is configured to: receive master cell group (MCG) abnormality information reported by the terminal via a signaling radio bearer 3 (SRB3).

An embodiment of the present disclosure further provides a network-side device, where the network-side device belongs to a master cell group (MCG) of a terminal, and the network-side device includes: a transceiver, a memory, a processor and a program stored in the memory and executable by the processor; where the processor is configured to: receive an MCG abnormality notification message, sent by an SCG of the terminal, indicating that the MCG is abnormal.

An embodiment of the present disclosure further provides an information reporting apparatus, applied to a terminal, including: a reporting module, configured to report, in a case that an abnormality is detected in a master cell group (MCG), MCG abnormality information via a signaling radio bearer 3 (SRB3).

An embodiment of the present disclosure further provides an information reporting apparatus, applied to a network-side device which belongs to an SCG of a terminal, including: a first transceiving module, configured to receive MCG abnormality information reported by the terminal via a signaling radio bearer 3 (SRB3).

An embodiment of the present disclosure further provides an information reporting apparatus, applied to a network-side device which belongs to a master cell group (MCG) of a terminal, including: a second transceiving module, configured to receive an MCG abnormality notification message, sent by an SCG of the terminal, indicating that the MCG is abnormal.

An embodiment of the present disclosure further provides a computer readable storage medium having a computer program stored thereon, where the computer program is configured to be performed by a processor to implement the steps of the information reporting methods described as above.

At least one of the above-mentioned technical solutions of the specific embodiments of the present disclosure has the following beneficial effects.

In the information reporting method according to the embodiment of the present disclosure, when the MCG is abnormal, the terminal reports the MCG abnormality information to the SCG side via the SRB3, and performs an RRC connection reconfiguration in coordination with the network side, which avoids an RRC connection reestablishment procedure in the related art when the MCG is abnormal, thereby avoiding a transmission interruption on the MCG side and the SCG side caused by the reestablishment procedure.

BRIEF DESCRIPTION OF THE DRAWINGS

FIG. 1 is a flow diagram illustrating the first implementation of the information reporting method according to an embodiment of the present disclosure;

FIG. 2 is a flow diagram illustrating the second implementation of the information reporting method according to an embodiment of the present disclosure;

FIG. 3 is a flow diagram illustrating the third implementation of the information reporting method according to an embodiment of the present disclosure;

FIG. 4 is a schematic structural diagram illustrating a terminal according to an embodiment of the present disclosure;

DETAILED DESCRIPTION

Figure 5:
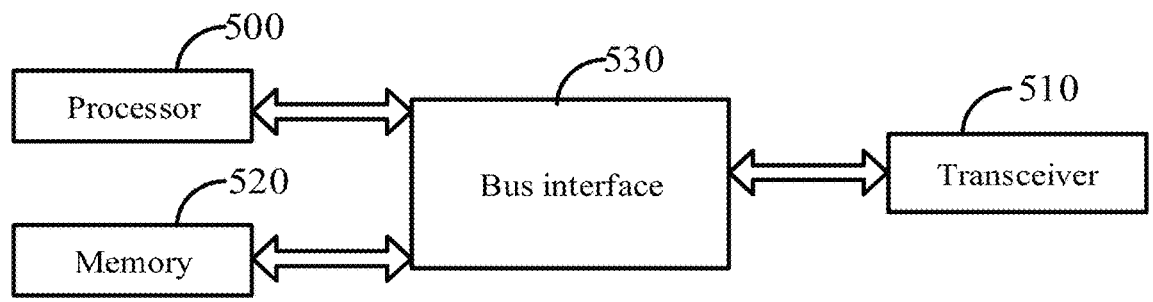
FIG. 5 is a schematic structural diagram illustrating the first implementation of a network-side device according to an embodiment of the present disclosure.

In order to make the technical problems to be solved, technical solutions and advantages of the present disclosure clearer, the present disclosure will be described in detail below with reference to the drawings and the specific embodiments.

The information reporting methods described in embodiments of the present disclosure are applied in a dual connectivity architecture. Both a Long Term Evolution (LTE) base station and a $5^{th}$ generation (5G) base station are connected to an LTE core network, an LTE evolved node base station (eNB) always acts as a master eNB (MeNB), the 5G base station (next generation node base station, gNB) acts as a secondary eNB (SeNB), and the LTE eNB and the 5G gNB are connected via an Xx interface. S1-C in a control plane terminates at the LTE eNB, and control-plane information is interchanged between LTE and 5G via an Xx-C interface. A user plane has respective user-plane protocol architectures in different dual-connectivity modes. The data plane radio bearer may be served by an MeNB or an SeNB independently, or served by an MeNB and an SeNB simultaneously. When served by the MeNB only, the data plane radio bearer is called MCG bearer (MCG is a serving cell group controlled by the MeNB); when served by SeNB only, the data plane radio bearer is called SCG bearer (SCG is a serving cell group controlled by the SeNB); when served by the MeNB and the SeNB simultaneously, the data plane radio bearer is called split bearer or SCG split bearer.

In order to solve the problem that, after the security is activated on the MCG side, RRC signaling transmission is transmitted through the SRB1 or the SRB2, and when an MCG abnormality is detected, the SRB1 is recovered through the RRC connection reestablishment procedure, and the DRB and SCG configuration are recovered through an RRC reconfiguration message sent by the network side, such that the RRC reestablishment procedure causes transmission interruptions not only on the MCG side, but also on the SCG side, in the information reporting methods in embodiments of the present disclosure, MCG abnormality information is reported via the SRB3 when an abnormality is detected in the MCG, to avoid the RRC connection reestablishment procedure in the related art when the MCG is abnormal, thereby reducing transmission interruptions on the MCG side and the SCG side caused by MCG abnormalities.

The first implementation of the information reporting method according to the embodiment of the present disclosure is performed by a terminal, as shown in FIG. 1, and includes the following step S110.

S110, reporting, in a case that an abnormality is detected in a master cell group (MCG), MCG abnormality information via a signaling radio bearer 3 (SRB3).

It should be noted that, in a dual connectivity scenario, the SRB3 is used to directly transmit RRC signaling between the SCG and the UE, and is used for NR resource configuration and mobility management on the SCG side.

In the information reporting method according to the embodiment of the present disclosure, when the MCG is abnormal, the terminal reports the MCG abnormality information to the SCG side via the SRB3, and performs an RRC connection reconfiguration in coordination with the network side, which avoids an RRC connection reestablishment procedure in the related art when the MCG is abnormal, thereby avoiding a transmission interruption on the MCG side and the SCG side caused by the reestablishment procedure.

Further, an information reporting method according to an embodiment of the present disclosure further includes: receiving an RRC reconfiguration message sent by an SCG, to which the terminal is connected, via the SRB3; performing an RRC reconfiguration according to the RRC reconfiguration message.

Specifically, the RRC reconfiguration message includes first RRC reconfiguration information determined by the MCG of the terminal and/or second RRC reconfiguration information determined by the SCG.

According to the RRC configuration in the RRC reconfiguration message, the terminal performs operations such as reconfiguring the MCG/SCG, releasing the MCG/SCG, and/or releasing the RRC connection.

In the embodiment of the present disclosure, it is determined that the abnormality is detected in the MCG in a case that at least one of the following events is detected: a radio link failure (RLF) in the MCG; a failure of an MCG-side synchronization reconfiguration; a failure of an inter-radio access technology (Inter-RAT) handover from new radio (NR); a failure of lower-layer packet data convergence protocol (PDCP) integrity protection and verification corresponding to an SRB1 or an SRB2; a failure of a radio resource control (RRC) reconfiguration procedure.

Specifically, in step S110, when the terminal in DC or dual-connectivity state detects at least one of the above events, the terminal determines that the MCG is abnormal, and reports the MCG abnormality information to the SCG via the SRB3.

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of a secondary cell group (SCG)-side serving cell when the MCG is abnormal; a measurement result of a neighboring cell obtained based on an SCG measurement configuration when the MCG is abnormal.

It should be noted that, the measurement result includes a cell-level measurement result and/or a beam-level measurement result.

Specifically, the MCG abnormality cause included in the MCG abnormality information may assist the network side in learning the specific cause of the MCG abnormality, and dealing with it accordingly.

The measurement result of the MCG-side serving cell (including the cell-level measurement result and/or beam-level measurement result) when the MCG is abnormal included in the MCG abnormality information may assist the network side in learning a channel condition of the serving cell when the MCG is abnormal, so as to assist the network side in selecting an appropriate cell or node to recover the MCG.

The measurement result of the neighboring cell obtained based on the MCG measurement configuration (including the cell-level measurement result and/or beam-level measurement result) when the MCG is abnormal included in the MCG abnormality information may assist the network side in learning a channel condition of the neighboring cell when the MCG is abnormal, so as to assist the network side in selecting an appropriate cell or node to recover the MCG.

The measurement result of the SCG-side serving cell (including the cell-level measurement result and/or beam-level measurement result) when the MCG is abnormal included in the MCG abnormality information may assist the network side in learning a channel condition of the SCG serving cell when the MCG is abnormal, so as to assist the network side in selecting an appropriate cell or node to recover the MCG or modify the SCG.

The measurement result of the neighboring cell obtained based on the SCG measurement configuration (including the cell-level measurement result and/or beam-level measurement result) when the MCG is abnormal included in the MCG abnormality information may assist the network side in learning a channel condition of the neighboring cell when the MCG is abnormal, so as to assist the network side in selecting an appropriate cell or node to recover the MCG or modify the SCG.

The exact information included in the MCG abnormality information may be determined according to a pre-configuration.

Optionally, the information reporting method according to the embodiment of the present disclosure further includes: determining whether a predetermined condition is satisfied in a case that the abnormality is detected in the MCG; reporting the MCG abnormality information via the SRB3 in a case that the predetermined condition is satisfied.

Optionally, the predetermined condition includes at least one of: a condition that the SRB3 is established; a condition that the terminal has a capability to establish the SRB3; a condition that an SCG to which the terminal is connected has a capability to establish the SRB3; a condition that transmission on a side of the SCG to which the terminal is connected is not suspended.

In the above predetermined condition, that the transmission on a side of the SCG to which the terminal is connected is not suspended means the SCG side transmission is normal, so that information transmitted by the terminal via the SRB3 may be received normally. In addition, the above predetermined condition is a condition to be satisfied so that a terminal in the DC or multi-connectivity state may currently transmit information to the SCG via the SRB3. The terminal performs the step S110, i.e., reporting the MCG abnormality information via the SRB3, only when the terminal determines that at least one or more of the above-mentioned conditions are satisfied.

For example, if the predetermined condition includes that the SRB3 is established, the terminal reports, only when the SRB3 is established, the MCG abnormality information to the SCG side via the SRB3 in a case that an abnormality is detected in the MCG; if the predetermined condition includes both that the SRB3 is established and that transmission on a side of the SCG to which the terminal is connected is not suspended, the terminal reports, only when the SRB3 is established and transmission on a side of the SCG to which the terminal is connected is not suspended (that is, the SCG-side transmission is normal), the MCG abnormality information to the SCG side via the SRB3 in a case that an abnormality is detected in the MCG; or when the predetermined condition includes that an SCG to which the terminal is connected has a capability to establish the SRB3, if the terminal operates in a DC mode and the network side SCG has the ability to establish the SRB3 even if the SRB3 is not established, the UE may report the MCG abnormality information to the SCG side via the SRB3 in a case that an abnormality is detected in the MCG.

The exact condition that needs to be included in the predetermined condition may be determined in advance according to a system configuration.

Optionally, the information reporting method according to the embodiment of the present disclosure further includes performing at least one of the following operations in a case that the abnormality is detected in the MCG: suspending transmission for all SRBs and data radio bearers (DRBs) in the MCG; resetting MCG media access control (MAC); retaining an MCG measurement configuration and continuing performing MCG measurement.

By using the information reporting method described in the embodiment of the present disclosure, when the terminal detects that the MCG is abnormal, the terminal reports the MCG abnormality information via the SRB3, which may avoid the transmission interruption on the MCG side and the SCG side caused by the reestablishment procedure.

The second implementation of the information reporting method according to the embodiment of the present disclosure is performed by a network-side device which belongs to an SCG of a terminal, as shown in FIG. 2, and the method includes the following step S210.

S210, receiving master cell group (MCG) abnormality information reported by the terminal via a signaling radio bearer 3 (SRB3).

By using the information reporting method described in the embodiment of the present disclosure, the network side SCG may receive the MCG abnormality information reported by the terminal via the SRB3 to learn that the MCG is abnormal.

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of an SCG-side serving cell when the MCG is abnormal; a measurement result of a neighboring cell obtained based on an SCG measurement configuration when the MCG is abnormal.

In the embodiment of the present disclosure, the measurement result includes a cell-level measurement result and/or a beam-level measurement result.

In the embodiment of the present disclosure, optionally, the method further includes: sending a radio resource control (RRC) reconfiguration message to the terminal via the SRB3; where the RRC reconfiguration message includes first RRC reconfiguration information determined by the MCG of the terminal and/or second RRC reconfiguration information determined by the SCG.

By using the information reporting method described in the embodiment of the present disclosure, the network side SCG may receive the MCG abnormality information reported by the terminal via the SRB3 to learn that the MCG is abnormal, and perform the RRC connection reconfiguration to avoid the RRC connection reestablishment procedure.

In the information reporting method according to the embodiment of the present disclosure, in one implementation of sending the RRC reconfiguration message to the terminal via the SRB3, the RRC reconfiguration message includes the first RRC reconfiguration information.

Subsequent to the receiving the MCG abnormality information reported by the terminal via the SRB3 in the step S210, the method further includes: sending the MCG abnormality information to the MCG of the terminal; receiving the first RRC reconfiguration information sent by the MCG based on the MCG abnormality information.

In the foregoing manner, after receiving the MCG abnormality information reported by the terminal via the SRB3 in the step S210, the network side device of the SCG forwards the MCG abnormality information to the MCG of the terminal; the MCG triggers further abnormality processing operations based on the MCG abnormality information. Specifically, the MCG determines the MCG abnormality cause according to the MCG abnormality information forwarded by the SCG; optionally, when the MCG abnormality information includes the measurement result of the serving cell and/or neighboring cell, the MCG may perform operations such as reconfiguring the MCG/SCG, releasing the MCG/SCG, and/or releasing the RRC connection according to the measurement result and its own algorithm, determine the first RRC reconfiguration information, generate the RRC message, and forward the RRC message including the first RRC reconfiguration information to the SCG side through an interface message; the SCG side forwards the RRC reconfiguration message including the first RRC reconfiguration information to the terminal via the SRB3.

Optionally, in the embodiment of the present disclosure, the RRC reconfiguration message sent by the SCG side to the terminal further includes the second RRC reconfiguration information determined by the SCG, which is used to determine configuration information of some parameters on the SCG side during the RRC reconfiguration.

Based on the manner described above, subsequent to the receiving the first RRC reconfiguration information sent by the MCG based on the MCG abnormality information, the method further includes: determining the second RRC reconfiguration information.

Specifically, the SCG side may determine the second RRC reconfiguration information based on the first RRC reconfiguration information; or the SCG side may determine the second RRC reconfiguration information based on an indication of the MCG; or the SCG may also actively determine the second RRC reconfiguration information such as configuration information of some parameters.

On such basis, in the step of sending, by the SCG, the RRC reconfiguration message to the terminal via the SRB3, the transmitted RRC reconfiguration message further includes the second RRC reconfiguration information, that is, the transmitted RRC reconfiguration message includes both the first RRC reconfiguration information and the second RRC reconfiguration information.

In the information reporting method according to the embodiment of the present disclosure, in another implementation of sending the RRC reconfiguration message to the terminal via the SRB3, the RRC reconfiguration message includes the second RRC reconfiguration information.

Subsequent to the receiving the MCG abnormality information reported by the terminal via the SRB3, the method further includes: determining RRC reconfiguration suggestion information according to the MCG abnormality information; sending the RRC reconfiguration suggestion information to the MCG of the terminal; receiving a confirmation response message, sent by the MCG, in response to the RRC reconfiguration suggestion information; determining the second RRC reconfiguration information, and sending the RRC reconfiguration message to the terminal via the SRB3.

In the foregoing manner, after receiving the MCG abnormality information reported by the terminal via the SRB3, the SCG triggers further abnormality processing operations based on the MCG abnormality information. Specifically, according to the MCG abnormality information, the SCG may perform operations such as reconfiguring the MCG/SCG, releasing the MCG/SCG, and/or releasing the RRC connection, and determine the RRC reconfiguration suggestion information; and further, the SCG may send the determined RRC reconfiguration suggestion information to the MCG of the terminal. Optionally, the RRC reconfiguration suggestion information may carry the MCG abnormality information.

On such basis, the MCG may accept the RRC reconfiguration suggestion, and send a confirmation response message in response to the RRC reconfiguration suggestion information to the SCG through an interface message. Further, the SCG may determine the second RRC reconfiguration information. Optionally, the SCG may determine the RRC reconfiguration message according to the confirmation response message, and/or determine the second RRC reconfiguration information according to the RRC reconfiguration suggestion information, or the SCG may determines the second RRC reconfiguration information according to its own algorithm (i.e., without considering a feedback from the MCG side); after determining the second RRC reconfiguration information, the SCG sends the RRC reconfiguration message to the terminal via the SRB3, such that the second RRC reconfiguration information is included in the transmitted RRC reconfiguration message.

Optionally, the confirmation response message may further carry the first RRC reconfiguration information determined by the MCG.

In the information reporting method according to the embodiment of the present disclosure, in another implementation of sending the RRC reconfiguration message to the terminal via the SRB3, the RRC reconfiguration message includes the first RRC reconfiguration information.

Subsequent to the receiving the MCG abnormality information reported by the terminal via the SRB3, the method further includes: determining RRC reconfiguration suggestion information according to the MCG abnormality information; sending the RRC reconfiguration suggestion information to the MCG of the terminal; receiving a confirmation response message, sent by the MCG, in response to the RRC reconfiguration suggestion information, where the confirmation response message further carries the first RRC reconfiguration information determined by the MCG; sending the RRC reconfiguration message to the terminal according to the first RRC reconfiguration information.

In the foregoing manner, after receiving the MCG abnormality information reported by the terminal via the SRB3, the SCG triggers further abnormality processing operations based on the MCG abnormality information. Specifically, according to the MCG abnormality information, the SCG may perform operations such as reconfiguring the MCG/SCG, releasing the MCG/SCG, and/or releasing the RRC connection, and determine the RRC reconfiguration suggestion information; further, the SCG may send the determined RRC reconfiguration suggestion information to the MCG of the terminal. Optionally, the RRC reconfiguration suggestion information may carry the MCG abnormality information.

On such basis, the MCG may accept the RRC reconfiguration suggestion, and send a confirmation response message in response to the RRC reconfiguration suggestion information to the SCG through an interface message, where the confirmation response message further carries the first RRC reconfiguration information determined by the MCG; unlike the above implementation, in the implementation, based on the confirmation response message and the first RRC reconfiguration information carried in the confirmation response message, the SCG may determine that only the first RRC reconfiguration information is included in the RRC reconfiguration message when the RRC reconfiguration message is sent to the terminal.

In the information reporting method according to the embodiment of the present disclosure, in still another implementation of sending the RRC reconfiguration message to the terminal via the SRB3, the RRC reconfiguration message includes the first RRC reconfiguration information.

Subsequent to the receiving the MCG abnormality information reported by the terminal via the SRB3, the method further includes: determining RRC reconfiguration suggestion information according to the MCG abnormality information; sending the RRC reconfiguration suggestion information to the MCG of the terminal; receiving a rejection response message, sent by the MCG, in response to the RRC reconfiguration suggestion information and the first RRC reconfiguration information determined by the MCG.

In the foregoing manner, after receiving the MCG abnormality information reported by the terminal via the SRB3, the SCG triggers further abnormality processing operations based on the MCG abnormality information. Specifically, according to the MCG abnormality information, the SCG may perform operations such as reconfiguring the MCG/SCG, releasing the MCG/SCG, and/or releasing the RRC connection, and may determine the RRC reconfiguration suggestion information; further, the SCG may send the determined RRC reconfiguration suggestion information to the MCG of the terminal. Optionally, the RRC reconfiguration suggestion information may carry the MCG abnormality information.

On such basis, the MCG may reject the RRC reconfiguration suggestion, and send a rejection response message in response to the RRC reconfiguration suggestion information to the SCG through an interface message. The MCG sends the determined RRC configuration, i.e., the first RRC reconfiguration information, to the SCG, such that when the SCG sends the RRC reconfiguration message to the terminal, the transmitted RRC reconfiguration message includes the first RRC reconfiguration information determined by the MCG.

Optionally, in the above implementation, subsequent to receiving the first RRC reconfiguration information determined by the MCG, the method further includes: determining, by the SCG, the second RRC reconfiguration information.

Specifically, the SCG side may determine the second RRC reconfiguration information based on the first RRC reconfiguration information; or the SCG side may determine the second RRC reconfiguration information based on an indication of the MCG; or the SCG may actively determine the second RRC reconfiguration information such as configuration information of some parameters.

On such basis, in the step of sending, by the SCG, the RRC reconfiguration message to the terminal via the SRB3, the transmitted RRC reconfiguration message further includes the second RRC reconfiguration information, that is, the transmitted RRC reconfiguration message includes both the first RRC reconfiguration information and the second RRC reconfiguration information.

In the third implementation of the information reporting method according to the embodiment of the present disclosure, the method is performed by a network-side device which belongs to an MCG of a terminal, as shown in FIG. 3, and the method includes the following step S310.

S310, receiving an MCG abnormality notification message, sent by an SCG of the terminal, indicating that the MCG is abnormal.

The MCG abnormality notification message includes MCG abnormality information and/or RRC reconfiguration suggestion information.

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of an SCG-side serving cell when the MCG is abnormal; a measurement result of a neighboring cell obtained based on an SCG measurement configuration when the MCG is abnormal.

Optionally, the measurement result includes a cell-level measurement result and/or a beam-level measurement result.

Optionally, in a case that the MCG abnormality notification message includes the MCG abnormality information, the method further includes: determining, according to the MCG abnormality information, first RRC reconfiguration information for performing an RRC reconfiguration; sending the first RRC reconfiguration information to the SCG.

In the foregoing manner, after receiving the MCG abnormality information reported by the terminal via the SRB3, the SCG forwards the MCG abnormality information to the MCG of the terminal; the MCG triggers further abnormality processing operations based on the MCG abnormality information. Specifically, the MCG determines the MCG abnormality cause according to the MCG abnormality information forwarded by the SCG; optionally, when the MCG abnormality information includes the measurement result of the serving cell and/or neighboring cell, the MCG may perform operations such as reconfiguring the MCG/SCG, releasing the MCG/SCG, and/or releasing the RRC connection according to the measurement result and its own algorithm, determine the first RRC reconfiguration information, generate the RRC message, and forward the RRC message including the first RRC reconfiguration information to the SCG side through an interface message; the SCG side forwards the RRC reconfiguration message including the first RRC reconfiguration information to the terminal via the SRB3.

Optionally, in a case that the MCG abnormality notification message includes the RRC reconfiguration suggestion information, the method further includes: sending a confirmation response message in response to the RRC reconfiguration suggestion information to the SCG; or sending a rejection response message in response to the RRC reconfiguration suggestion information to the SCG.

Optionally, the confirmation response message and the rejection response message carry the first RRC reconfiguration information determined by the MCG for performing an RRC reconfiguration.

By using the information reporting method described in the embodiment of the present disclosure, after receiving the MCG abnormality information reported by the terminal via the SRB3, the SCG triggers further abnormality processing operations based on the MCG abnormality information. Specifically, according to the MCG abnormality information, the SCG may perform operations such as reconfiguring the MCG/SCG, releasing the MCG/SCG, and/or releasing the RRC connection, and determine the RRC reconfiguration suggestion information; further, the SCG may send the determined RRC reconfiguration suggestion information to the MCG of the terminal. Optionally, the RRC reconfiguration suggestion information may carry the MCG abnormality information.

On such basis, the MCG may accept the RRC reconfiguration suggestion, and send a confirmation response message in response to the RRC reconfiguration suggestion information to the SCG through an interface message. Or, the MCG may reject the RRC reconfiguration suggestion, and send a rejection response message in response to the RRC reconfiguration suggestion information to the SCG through an interface message.

Optionally, when the MCG sends the confirmation response message in response to the RRC reconfiguration suggestion information to the SCG, the confirmation response message carries the first RRC reconfiguration information determined by the MCG for performing an RRC reconfiguration.

When the MCG sends the rejection response message in response to the RRC reconfiguration suggestion information, the rejection response message carries the first RRC reconfiguration information determined by the MCG for performing an RRC reconfiguration, where the first RRC reconfiguration information includes an RRC configuration generated by the MCG, such as information for determining operations such as reconfiguring the MCG/SCG, releasing the MCG/SCG, and/or releasing the RRC connection.

In the embodiment of the present disclosure, optionally, the MCG abnormality notification message includes the MCG abnormality information and the RRC reconfiguration suggestion information, so that the MCG sends the confirmation response message or the rejection response message to the SCG according to the MCG abnormality information and the RRC reconfiguration suggestion information.

An embodiment of the present disclosure further provides a terminal, as shown in FIG. 4, the terminal includes: a processor 401; and a memory 403 connected to the processor 401 through a bus interface 402, the memory 403 is used to store programs and data used by the processor 401 when performing operations, the transceiver 404 is connected to the bus interface 402 for receiving and sending data under the control of the processor 401.

The processor 401 calls and executes the programs and data stored in the memory 403 to perform the following process: reporting, in a case that an abnormality is detected in a master cell group (MCG), MCG abnormality information via a signaling radio bearer 3 (SRB3).

Optionally, the processor 401 determines that the abnormality is detected in the MCG in a case that at least one of the following events is detected: a radio link failure (RLF) in the MCG; a failure of an MCG-side synchronization reconfiguration; a failure of an inter-radio access technology (Inter-RAT) handover from new radio (NR); a failure of lower-layer packet data convergence protocol (PDCP) integrity protection and verification corresponding to an SRB1 or an SRB2; a failure of a radio resource control (RRC) reconfiguration procedure.

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of a secondary cell group (SCG)-side serving cell when the MCG is abnormal; a measurement result of a neighboring cell obtained based on an SCG measurement configuration when the MCG is abnormal.

Optionally, the measurement result includes a cell-level measurement result and/or a beam-level measurement result.

Optionally, the processor 401 is further configured to: determine whether a predetermined condition is satisfied in a case that the abnormality is detected in the MCG; report the MCG abnormality information via the SRB3 in a case that the predetermined condition is satisfied.

Optionally, the predetermined condition includes at least one of: a condition that the SRB3 is established; a condition that the terminal has a capability to establish the SRB3; a condition that an SCG to which the terminal is connected has a capability to establish the SRB3; a condition that transmission on a side of the SCG to which the terminal is connected is not suspended.

Optionally, the processor 401 is further configured to perform at least one of the following operations in a case that the abnormality is detected in the MCG: suspending transmission for all SRBs and data radio bearers (DRBs) in the MCG; resetting MCG media access control (MAC); retaining an MCG measurement configuration and continuing performing MCG measurement.

Optionally, the processor 401 is further configured to: receive an RRC reconfiguration message sent by an SCG, to which the terminal is connected, via the SRB3; perform an RRC reconfiguration according to the RRC reconfiguration message.

It should be noted that, in FIG. 4, a bus architecture may include any number of interconnected buses and bridges. Various circuits, specifically, one or more processors represented by the processor 401 and a memory represented by the memory 403, are linked together. The bus architecture may also link various other circuits such as peripherals, voltage regulators and power management circuits, which are well known in the art, and therefore a further description is omitted herein. The bus interface provides interfaces. The transceiver 404 may be a plurality of elements, that is, includes a transmitter and a receiver, to provide units configured to communicate with various other devices over a transmission medium. For different terminals, the user interface 405 can also be an interface capable of externally/internally connecting the required devices which including but not limited to a keypad, a display, a speaker, a microphone, a joystick, and the like. The processor 401 is responsible for managing the bus architecture and general processing, and the memory 403 may store data used by the processor 401 when performing operations.

An embodiment of the present disclosure further provides a network-side device, and the network-side device belongs to an SCG of a terminal. As shown in FIG. 5, the network-side device includes: a processor 500, a memory 520 connected to the processor 500 through a bus interface 530, and a transceiver 510 connected to the processor 500 via the bus interface; where the memory 520 is used to store programs and data used by the processor 41 when performing operations; data information or pilot signals are sent through the transceiver 510, and uplink control channels are also received through said transceiver 510; when the processor 500 calls and executes the program and data stored in the memory 520, the following functional modules are implemented, and the processor 500 is used to read the program in the memory 520 to perform the following process: receiving master cell group (MCG) abnormality information reported by the terminal via a signaling radio bearer 3 (SRB3).

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of an SCG-side serving cell when the MCG is abnormal; a measurement result of a neighboring cell obtained based on an SCG measurement configuration when the MCG is abnormal.

Optionally, the measurement result includes a cell-level measurement result and/or a beam-level measurement result.

Optionally, the processor 500 is further configured to: send a radio resource control (RRC) reconfiguration message to the terminal via the SRB3; where the RRC reconfiguration message includes first RRC reconfiguration information determined by the MCG of the terminal and/or second RRC reconfiguration information determined by the SCG of the terminal.

Optionally, the RRC reconfiguration message includes the first RRC reconfiguration information.

Subsequent to the receiving the MCG abnormality information reported by the terminal via the SRB3, the processor 500 is further configured to: send the MCG abnormality information to the MCG of the terminal; receive the first RRC reconfiguration information sent by the MCG based on the MCG abnormality information.

Optionally, the RRC reconfiguration message includes the second RRC reconfiguration information.

Subsequent to the receiving the MCG abnormality information reported by the terminal via the SRB3, the processor 500 is further configured to: determine RRC reconfiguration suggestion information according to the MCG abnormality information; send the RRC reconfiguration suggestion information to the MCG of the terminal; receive a confirmation response message, sent by the MCG, in response to the RRC reconfiguration suggestion information; determine the second RRC reconfiguration information, and send the RRC reconfiguration message to the terminal via the SRB3.

Optionally, the confirmation response message further carries the first RRC reconfiguration information determined by the MCG.

The RRC reconfiguration message further includes the first RRC reconfiguration information.

Optionally, the RRC reconfiguration message includes the first RRC reconfiguration information;

Subsequent to the receiving the MCG abnormality information reported by the terminal via the SRB3, the processor 500 is further configured to: determine RRC reconfiguration suggestion information according to the MCG abnormality information; send the RRC reconfiguration suggestion information to the MCG of the terminal; receive a confirmation response message, sent by the MCG, in response to the RRC reconfiguration suggestion information, where the confirmation response message further carries the first RRC reconfiguration information determined by the MCG; send the RRC reconfiguration message to the terminal according to the first RRC reconfiguration information.

Optionally, the RRC reconfiguration message includes the first RRC reconfiguration information;

Subsequent to the receiving the MCG abnormality information reported by the terminal via the SRB3, the processor 500 is further configured to: determine RRC reconfiguration suggestion information according to the MCG abnormality information; send the RRC reconfiguration suggestion information to the MCG of the terminal; receive a rejection response message, sent by the MCG, in response to the RRC reconfiguration suggestion information and the first RRC reconfiguration information determined by the MCG.

Optionally, the RRC reconfiguration message further includes the second RRC reconfiguration information.

Subsequent to receiving the first RRC reconfiguration information determined by the MCG, the processor 500 is further configured to: determine the second RRC reconfiguration information.

Optionally, in sending the RRC reconfiguration suggestion information to the MCG of the terminal, the RRC reconfiguration suggestion information carries the MCG abnormality information.

In addition, in FIG. 5, a bus architecture may include any number of interconnected buses and bridges. Various circuits, specifically, one or more processors represented by the processor 500 and a memory represented by the memory 520, are linked together. The bus architecture may also link various other circuits such as peripherals, voltage regulators and power management circuits, which are well known in the art, and therefore a further description is omitted herein. The bus interface provides interfaces. The transceiver 510 may be a plurality of elements, that is, includes a transmitter and a receiver, to provide units configured to communicate with various other devices over a transmission medium. The processor 500 is responsible for managing the bus architecture and general processing, and the memory 520 may store data used by the processor 500 when performing operations.

Figure 6:
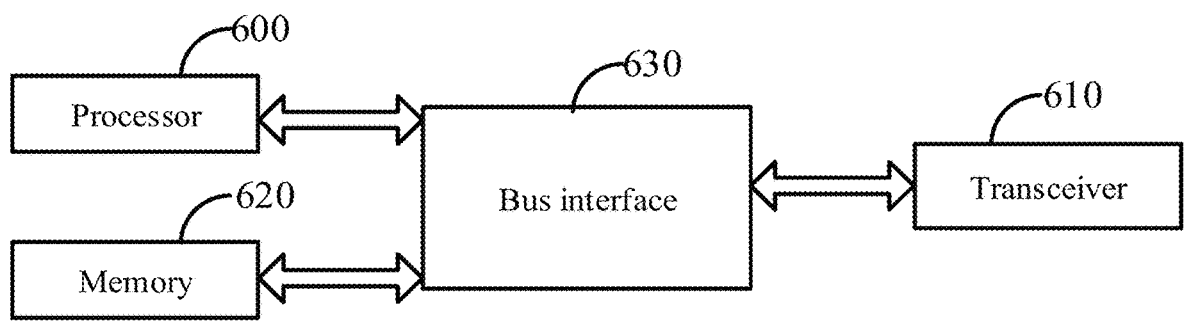
FIG. 6 is a schematic structural diagram illustrating the second implementation of a network-side device according to an embodiment of the present disclosure.

An embodiment of the present disclosure further provides a network-side device, where the network-side device belongs to an MCG of a terminal. As shown in FIG. 6, the network-side device includes: a processor 600, a memory 620 connected to the processor 600 through a bus interface 630, and a transceiver 610 connected to the processor 600 via the bus interface; where the memory 620 is used to store programs and data used by the processor when performing operations; data information or pilot signals are sent through the transceiver 610, and uplink control channels are also received through said transceiver 610; when the processor 600 calls and executes the program and data stored in the memory 620, the following functional modules are implemented, and the processor 600 is used to read the program in the memory 620 to perform the following process: receiving an MCG abnormality notification message, sent by an SCG of the terminal, indicating that the MCG is abnormal.

Optionally, the MCG abnormality notification message includes MCG abnormality information and/or RRC reconfiguration suggestion information.

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of an SCG-side serving cell when the MCG is abnormal; a measurement result of a neighboring cell obtained based on an SCG measurement configuration when the MCG is abnormal.

Optionally, the measurement result includes a cell-level measurement result and/or a beam-level measurement result.

Optionally, in a case that the MCG abnormality notification message includes the MCG abnormality information, the processor 600 is further configured to: determine, according to the MCG abnormality information, first RRC reconfiguration information for performing an RRC reconfiguration; send the first RRC reconfiguration information to the SCG.

Optionally, in a case that the MCG abnormality notification message includes the RRC reconfiguration suggestion information, the method further includes: sending a confirmation response message in response to the RRC reconfiguration suggestion information to the SCG; or sending a rejection response message in response to the RRC reconfiguration suggestion information to the SCG.

Optionally, the confirmation response message and the rejection response message carry the first RRC reconfiguration information determined by the MCG for performing an RRC reconfiguration.

In addition, in FIG. 6, a bus architecture may include any number of interconnected buses and bridges. Various circuits, specifically, one or more processors represented by the processor 600 and a memory represented by the memory 620, are linked together. The bus architecture may also link various other circuits such as peripherals, voltage regulators and power management circuits, which are well known in the art, and therefore a further description is omitted herein. The bus interface provides interfaces. The transceiver 610 may be a plurality of elements, that is, includes a transmitter and a receiver, to provide units configured to communicate with various other devices over a transmission medium. The processor 600 is responsible for managing the bus architecture and general processing, and the memory 620 may store data used by the processor 600 when performing operations.

Figure 7:
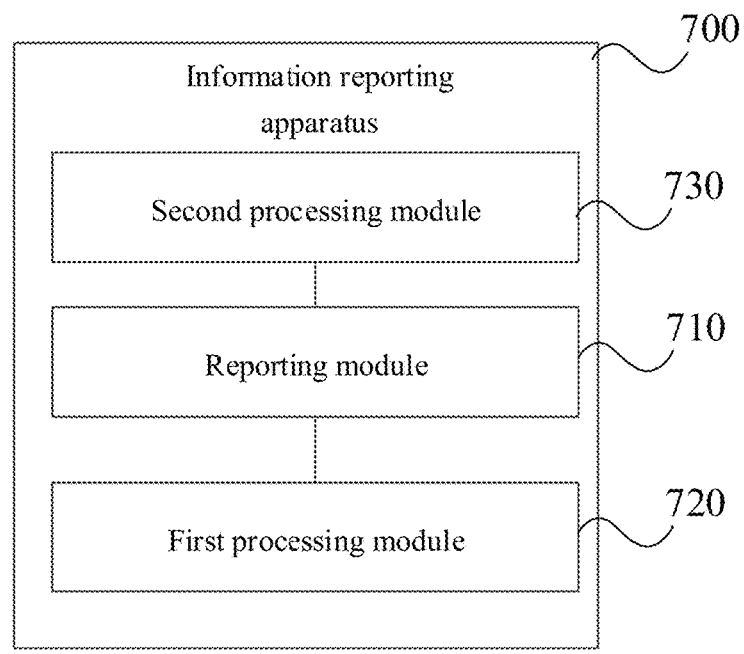
FIG. 7 is a schematic structural diagram illustrating the first implementation of an information reporting apparatus according to an embodiment of the present disclosure.

In another aspect, an embodiment of the present disclosure further provides an information reporting apparatus applied to a terminal. As shown in FIG. 7, the information reporting apparatus 700 includes: a reporting module 710, configured to report, in a case that an abnormality is detected in a master cell group (MCG), MCG abnormality information via a signaling radio bearer 3 (SRB3).

Optionally, the reporting module 710 determines that the abnormality is detected in the MCG in a case that at least one of the following events is detected: a radio link failure (RLF) in the MCG; a failure of an MCG-side synchronization reconfiguration; a failure of an inter-radio access technology (Inter-RAT) handover from new radio (NR); a failure of lower-layer packet data convergence protocol (PDCP) integrity protection and verification corresponding to an SRB1 or an SRB2; a failure of a radio resource control (RRC) reconfiguration procedure.

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of a secondary cell group (SCG)-side serving cell when the MCG is abnormal; a measurement result of a neighboring cell obtained based on an SCG measurement configuration when the MCG is abnormal.

Optionally, the measurement result includes a cell-level measurement result and/or a beam-level measurement result.

Optionally, the reporting module 710 is further configured to: determine whether a predetermined condition is satisfied in a case that the abnormality is detected in the MCG; report the MCG abnormality information via the SRB3 in a case that the predetermined condition is satisfied.

Optionally, the predetermined condition includes at least one of: a condition that the SRB3 is established; a condition that the terminal has a capability to establish the SRB3; a condition that an SCG to which the terminal is connected has a capability to establish the SRB3; a condition that transmission on a side of the SCG to which the terminal is connected is not suspended.

Further, the information reporting apparatus further includes: a first processing module 720 configured to perform at least one of the following operations in a case that the abnormality in the MCG is detected by the reporting module 710: suspending transmission for all SRBs and data radio bearers (DRBs) in the MCG; resetting MCG media access control (MAC); retaining an MCG measurement configuration and continuing performing MCG measurement.

Further, the information reporting apparatus further includes: a second processing module 730, configured to receive an RRC reconfiguration message sent by an SCG, to which the terminal is connected, via the SRB3; perform an RRC reconfiguration according to the RRC reconfiguration message.

Figure 8:
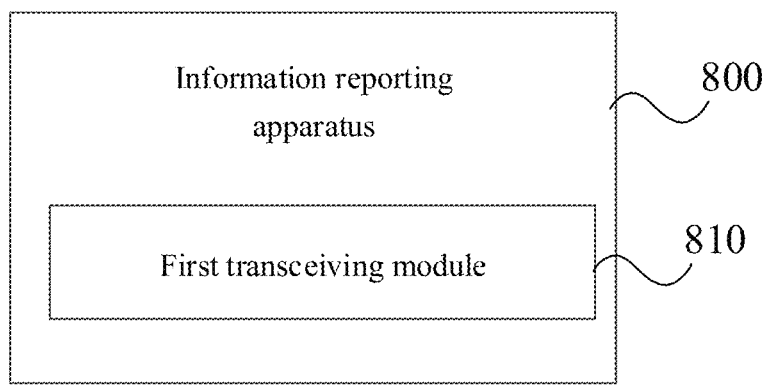
FIG. 8 is a schematic structural diagram illustrating the second implementation of an information reporting apparatus according to an embodiment of the present disclosure.

An embodiment of the present disclosure further provides an information reporting apparatus applied to a network-side device which belongs to an SCG of a terminal. As shown in FIG. 8, the information reporting apparatus 800 includes: a first transceiving module 810, configured to receive MCG abnormality information reported by the terminal via a signaling radio bearer 3 (SRB3).

Optionally, the MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of an SCG-side serving cell when the MCG is abnormal; a measurement result of a neighboring cell obtained based on an SCG measurement configuration when the MCG is abnormal.

Optionally, the measurement result includes a cell-level measurement result and/or a beam-level measurement result.

Optionally, the first transceiving module 810 is further configured to: send a radio resource control (RRC) reconfiguration message to the terminal via the SRB3; where the RRC reconfiguration message includes first RRC reconfiguration information determined by the MCG of the terminal and/or second RRC reconfiguration information determined by the SCG.

Optionally, the RRC reconfiguration message includes the first RRC reconfiguration information.

Subsequent to the receiving the MCG abnormality information reported by the terminal via the SRB3, the first transceiving module 810 is further configured to: send the MCG abnormality information to the MCG of the terminal; receive the first RRC reconfiguration information sent by the MCG based on the MCG abnormality information.

Optionally, the RRC reconfiguration message includes the second RRC reconfiguration information.

Subsequent to the receiving the MCG abnormality information reported by the terminal via the SRB3, the first transceiving module 810 is further configured to: determine RRC reconfiguration suggestion information according to the MCG abnormality information; send the RRC reconfiguration suggestion information to the MCG of the terminal; receive a confirmation response message, sent by the MCG, in response to the RRC reconfiguration suggestion information; determine the second RRC reconfiguration information, and send the RRC reconfiguration message to the terminal via the SRB3. Optionally, the confirmation response message may further carry the first RRC reconfiguration information determined by the MCG.

The RRC reconfiguration message further includes the first RRC reconfiguration information.

Optionally, the RRC reconfiguration message includes the first RRC reconfiguration information.

Subsequent to the receiving the MCG abnormality information reported by the terminal via the SRB3, the first transceiving module 810 is further configured to: determine RRC reconfiguration suggestion information according to the MCG abnormality information; send the RRC reconfiguration suggestion information to the MCG of the terminal; receive a rejection response message, sent by the MCG, in response to the RRC reconfiguration suggestion information and the first RRC reconfiguration information determined by the MCG.

Optionally, the RRC reconfiguration message further includes the second RRC reconfiguration information.

Subsequent to receiving the first RRC reconfiguration information determined by the MCG, the first transceiving module 810 is further configured to: determine the second RRC reconfiguration information.

Optionally, when the first transceiving module 810 sends the RRC reconfiguration suggestion information to the MCG of the terminal, the RRC reconfiguration suggestion information carries the MCG abnormality information.

An embodiment of the present disclosure further provides another information reporting apparatus applied to a network-side device which belongs to an MCG of a terminal.

Figure 9:
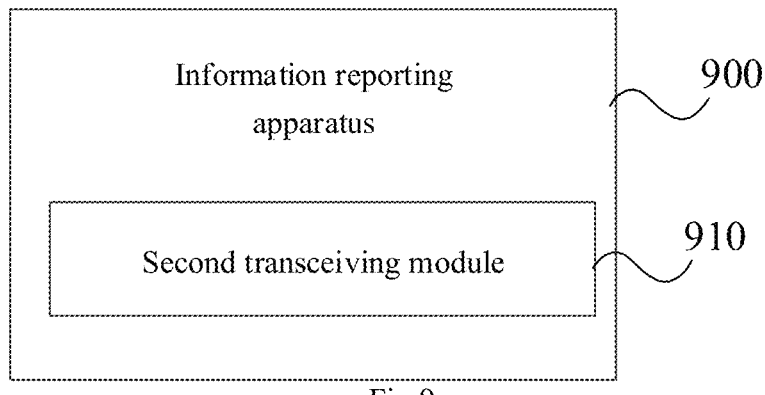
FIG. 9 is a schematic structural diagram illustrating the third implementation of an information reporting apparatus according to an embodiment of the present disclosure.

As shown in FIG. 9, the information reporting apparatus 900 includes: a second transceiving module 910, configured to receive an MCG abnormality notification message, sent by an SCG of the terminal, indicating that the MCG is abnormal.

Optionally, the MCG abnormality notification message includes MCG abnormality information and/or RRC reconfiguration suggestion information.

The MCG abnormality information includes at least one of: an MCG abnormality cause; a measurement result of an MCG-side serving cell when the MCG is abnormal; a measurement result of a neighboring cell obtained based on an MCG measurement configuration when the MCG is abnormal; a measurement result of an SCG-side serving cell when the MCG is abnormal; a measurement result of a neighboring cell obtained based on an SCG measurement configuration when the MCG is abnormal.

Optionally, the measurement result includes a cell-level measurement result and/or a beam-level measurement result.

Optionally, in a case that the MCG abnormality notification message includes the MCG abnormality information, the second transceiving module 910 is further configured to: determine, according to the MCG abnormality information, first RRC reconfiguration information for performing an RRC reconfiguration; send the first RRC reconfiguration information to the SCG.

Optionally, in a case that the MCG abnormality notification message includes the RRC reconfiguration suggestion information, the second transceiving module 910 is further configured to: send a confirmation response message in response to the RRC reconfiguration suggestion information to the SCG; or send a rejection response message in response to the RRC reconfiguration suggestion information to the SCG.

Optionally, the confirmation response message and the rejection response message carry the first RRC reconfiguration information determined by the MCG for performing an RRC reconfiguration.

In another aspect, a specifically embodiment of the present disclosure further provides a computer readable storage medium having a computer program stored thereon, and the computer program is configured to be executed by the processor to implement the steps of any one of the foregoing information reporting methods.

Based on the above description, a person skilled in the art should be able to understand the specific structure of the computer-readable storage medium that performs the information reporting method described in this disclosure, which will not be described in detail here.

In addition, it should be noted that in the device and the method of the present disclosure, it is apparent that various components or various steps may be decomposed and/or recombined. The decomposition and/or recombination should be considered as equivalent solutions of the present disclosure. Also, the steps of performing the above-described series of processes may naturally be performed in a chronological order in which the processes are illustrated, but it is not necessary to perform the processes in a chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or a computing device network, in forms of hardware, firmware, software, or a combination thereof, which may be implemented by those of ordinary skills in the art using their basic programming skills after they read the description of the present disclosure.

Therefore, the objects of the present disclosure may also be achieved by running a program or a set of programs on any computing device. The computing device may be a well-known general purpose device. Accordingly, the objects of the present disclosure may also be realized by merely providing a program product including program codes for implementing the method or device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, it is apparent that various components or steps may be decomposed and/or recombined. The decomposition and/or recombination should be considered as equivalent solutions of the present disclosure. Also, the steps of performing the series of processes described above may naturally be performed in the chronological order in which the processes are illustrated, but it is not necessary to perform the processes in the chronological order. Certain steps may be performed in parallel or independently of one another.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to be beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In embodiments provided in the present application, it should be understood that the disclosed devices and methods may be implemented in other manners. For example, the device embodiments described above are merely illustrative. For example, the device embodiments described above are merely illustrative. For example, a division of units is only a logical function division. In actual implementation, there may be another division manner, for example, a plurality of units or components may be combined or may be integrated into another system, or some features may be ignored or not executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. Some or all of the units may be selected based on actual needs to achieve the purpose of the technical solution of the embodiments.

In addition, each functional unit in various embodiments of the present disclosure may be integrated into one processing unit, or each unit may exist physically separately, or two or more units may be integrated into one unit.

If the functions are implemented in the form of software functional units as an independent product for sale or use, the software functional units may also be stored in a computer readable storage medium. Based on such an understanding, essential parts, or parts contributing to the related art, of the technical solution of the present disclosure may be implemented in a form of a software product. The computer software product is stored in a storage medium and includes several instructions to cause a computer device (which may be a personal computer, a server, or a network device, etc.) to perform all or some steps of the method according to the respective embodiments of the present disclosure. The foregoing storage medium includes various media that may store program codes, such as a USB flash drive, a mobile hard disk, a ROM, a RAM, a magnetic disk, or an optical disc.

It can be understood by those skilled in the art that the whole or parts of the process of the method in the above embodiment can be realized by a computer program controlling related hardware, the computer program is stored in a computer readable storage medium, when the program is executed, such as process of the embodiment of the above each method can be included. The storage medium may be a magnetic disk, an optical disc, a read-only memory (ROM), a random access memory (RAM), etc.

It is to be understood that the embodiments described in embodiments of the present disclosure can be implemented in hardware, software, firmware, middleware, microcode, or any combination thereof. For hardware implementation, processing units may be implemented in one or more application specific integrated circuits (ASICs), digital signal processors (DSPs), DSP devices (DSPDs), programmable logic devices (PLDs), field programmable gate arrays (FPGAs), general purpose processors, controllers, microcontrollers, microprocessors, other electronic units configured to perform the function described in the present disclosure or a combination thereof.

For software implementation, the techniques described in an embodiment of the present disclosure can be implemented by modules (e.g., procedures, functions, etc.) that perform the functions described in an embodiment of the present disclosure. The software code can be stored in the memory and executed by the processor. The memory can be implemented within the processor or external to the processor.

The descriptions above are optional implementations of the disclosure, it should be noted that improvements and embellishments may be made by one skilled in the art within the scope of the tenets of the present disclosure, and such improvements and embellishments shall be within the scope of the present disclosure.

What is claimed is:

1. An information reporting method, performed by a terminal in a dual connectivity (DC) scenario, comprising:
reporting, in a case that an abnormality is detected in a master cell group (MCG), MCG abnormality information via a signaling radio bearer (SRB) 3;
wherein the MCG abnormality information comprises at least one of:
a measurement result of a secondary cell group (SCG)-side serving cell when the MCG is abnormal;
a measurement result of a neighboring cell obtained based on an SCG measurement configuration when the MCG is abnormal.

2. The information reporting method according to claim 1, wherein it is determined that the abnormality is detected in the MCG in a case that at least one of following events is detected:
   a radio link failure (RLF) in the MCG;
   a failure of an MCG-side synchronization reconfiguration;
   a failure of an inter-radio access technology (Inter-RAT) handover from new radio (NR);
   a failure of lower-layer packet data convergence protocol (PDCP) integrity protection and verification corresponding to an SRB1 or an SRB2;
   a failure of a radio resource control (RRC) reconfiguration procedure.

3. The information reporting method according to claim 1, wherein the MCG abnormality information further comprises at least one of:
   an MCG abnormality cause;
   a measurement result of an MCG-side serving cell when the MCG is abnormal;
   a measurement result of a neighboring cell obtained based on an MCG measurement configuration when the MCG is abnormal;
   wherein the measurement result comprises a cell-level measurement result and/or a beam-level measurement result.

4. The information reporting method according to claim 1, further comprising:
   determining whether a predetermined condition is satisfied in a case that the abnormality is detected in the MCG;
   reporting the MCG abnormality information via the SRB3 in a case that the predetermined condition is satisfied;
   and/or,
   further comprising:
   performing at least one of following operations in a case that the abnormality is detected in the MCG:
   suspending transmission for all SRBs and data radio bearers (DRBs) in the MCG;
   resetting MCG media access control (MAC);
   retaining an MCG measurement configuration and continuing performing MCG measurement;
   and/or,
   further comprising:
   receiving an RRC reconfiguration message sent by an SCG, to which the terminal is connected, via the SRB3;
   performing an RRC reconfiguration according to the RRC reconfiguration message.

5. The information reporting method according to claim 4, wherein, the predetermined condition comprises at least one of:
   a condition that the SRB3 is established;
   a condition that the terminal has a capability to establish the SRB3;
   a condition that an SCG to which the terminal is connected has a capability to establish the SRB3;
   a condition that transmission on a side of the SCG to which the terminal is connected is not suspended.

6. An information reporting method, performed by a network-side device which belongs to a secondary cell group (SCG) of a terminal, comprising:
   receiving master cell group (MCG) abnormality information reported by the terminal via a signaling radio bearer (SRB) 3;
   wherein, the MCG abnormality information comprises at least one of:
   a measurement result of an SCG-side serving cell when the MCG is abnormal;
   a measurement result of a neighboring cell obtained based on an SCG measurement configuration when the MCG is abnormal.

7. The information reporting method according to claim 6, wherein, the MCG abnormality information further comprises at least one of:
   an MCG abnormality cause;
   a measurement result of an MCG-side serving cell when the MCG is abnormal;
   a measurement result of a neighboring cell obtained based on an MCG measurement configuration when the MCG is abnormal;
   wherein, the measurement result comprises a cell-level measurement result and/or a beam-level measurement result.

8. The information reporting method according to claim 6, further comprising:
   sending a radio resource control (RRC) reconfiguration message to the terminal via the SRB3;
   wherein the RRC reconfiguration message comprises first RRC reconfiguration information determined by the MCG of the terminal and/or second RRC reconfiguration information determined by the SCG.

9. The information reporting method according to claim 8, wherein the RRC reconfiguration message comprises the first RRC reconfiguration information;
   subsequent to the receiving the MCG abnormality information reported by the terminal via the SRB3, the method further comprises:
   sending the MCG abnormality information to the MCG of the terminal;
   receiving the first RRC reconfiguration information sent by the MCG based on the MCG abnormality information;
   wherein the RRC reconfiguration message further comprises the second RRC reconfiguration information;
   subsequent to receiving the first RRC reconfiguration information determined by the MCG, the method further comprises: determining the second RRC reconfiguration information.

10. The information reporting method according to claim 8, wherein the RRC reconfiguration message comprises the second RRC reconfiguration information;
   subsequent to the receiving the MCG abnormality information reported by the terminal via the SRB3, the method further comprises:
   determining RRC reconfiguration suggestion information according to the MCG abnormality information;
   sending the RRC reconfiguration suggestion information to the MCG of the terminal;
   receiving a confirmation response message, sent by the MCG, in response to the RRC reconfiguration suggestion information; determining the second RRC reconfiguration information, and sending the RRC reconfiguration message to the terminal via the SRB3;
   wherein the confirmation response message further carries the first RRC reconfiguration information determined by the MCG; and
   the RRC reconfiguration message further comprises the first RRC reconfiguration information;
   or,
   wherein the RRC reconfiguration message comprises the first RRC reconfiguration information;

subsequent to the receiving the MCG abnormality information reported by the terminal via the SRB3, the method further comprises:
determining RRC reconfiguration suggestion information according to the MCG abnormality information;
sending the RRC reconfiguration suggestion information to the MCG of the terminal;
receiving a confirmation response message, sent by the MCG, in response to the RRC reconfiguration suggestion information, wherein the confirmation response message further carries the first RRC reconfiguration information determined by the MCG;
sending the RRC reconfiguration message to the terminal according to the first RRC reconfiguration information;
or,
wherein the RRC reconfiguration message comprises the first RRC reconfiguration information;
subsequent to the receiving the MCG abnormality information reported by the terminal via the SRB3, the method further comprises:
determining RRC reconfiguration suggestion information according to the MCG abnormality information;
sending the RRC reconfiguration suggestion information to the MCG of the terminal;
receiving a rejection response message, sent by the MCG, in response to the RRC reconfiguration suggestion information, and the first RRC reconfiguration information determined by the MCG;
or,
wherein the RRC reconfiguration message further comprises the second RRC reconfiguration information;
subsequent to receiving the first RRC reconfiguration information determined by the MCG, the method further comprises: determining the second RRC reconfiguration information.

11. The information reporting method according to claim 10, wherein in the sending the RRC reconfiguration suggestion information to the MCG of the terminal, the RRC reconfiguration suggestion information carries the MCG abnormality information.

12. A network-side device, wherein the network-side device belongs to a secondary cell group (SCG) of a terminal, and the network-side device comprises: a transceiver, a memory, a processor and a program stored in the memory and executable by the processor; wherein the processor is configured to execute the program to implement the information reporting method according to claim 6.

13. An information reporting method, performed by a network-side device which belongs to a master cell group (MCG) of a terminal, comprising:
receiving an MCG abnormality notification message, sent by a secondary cell group (SCG) of the terminal, indicating that the MCG is abnormal;
wherein the MCG abnormality notification message comprises MCG abnormality information and/or radio resource control (RRC) reconfiguration suggestion information determined according to the MCG abnormality information;
wherein the MCG abnormality information comprises at least one of:
a measurement result of an SCG-side serving cell when the MCG is abnormal;
a measurement result of a neighboring cell obtained based on an SCG measurement configuration when the MCG is abnormal.

14. The information reporting method according to claim 13, wherein the MCG abnormality information further comprises at least one of:
an MCG abnormality cause;
a measurement result of an MCG-side serving cell when the MCG is abnormal;
a measurement result of a neighboring cell obtained based on an MCG measurement configuration when the MCG is abnormal;
wherein the measurement result comprises a cell-level measurement result and/or a beam-level measurement result;
wherein, in a case that the MCG abnormality notification message comprises the RRC reconfiguration suggestion information determined according to the MCG abnormality information, the method further comprises:
sending a confirmation response message in response to the RRC reconfiguration suggestion information to the SCG; or
sending a rejection response message in response to the RRC reconfiguration suggestion information to the SCG;
wherein, the confirmation response message and the rejection response message carry the first RRC reconfiguration information determined by the MCG for performing an RRC reconfiguration.

15. The information reporting method according to claim 13, wherein, in a case that the MCG abnormality notification message comprises the MCG abnormality information, the method further comprises:
determining, according to the MCG abnormality information, first RRC reconfiguration information for performing an RRC reconfiguration;
sending the first RRC reconfiguration information to the SCG.

16. A network-side device, wherein the network-side device belongs to a master cell group (MCG) of a terminal, and the network-side device comprises: a transceiver, a memory, a processor and a program stored in the memory and executable by the processor; wherein the processor is configured to execute the program to implement the information reporting method according to claim 13.

17. A terminal, comprising: a transceiver, a memory, a processor and a program stored in the memory and executable by the processor; wherein the processor is configured to:
report, in a case that an abnormality is detected in an MCG, MCG abnormality information via an SRB3;
wherein the MCG abnormality information comprises at least one of:
a measurement result of an SCG-side serving cell when the MCG is abnormal;
a measurement result of a neighboring cell obtained based on an SCG measurement configuration when the MCG is abnormal.

18. The terminal according to claim 17, wherein the processor determines that the abnormality is detected in the MCG in a case that at least one of following events is detected:
a radio link failure (RLF) in the MCG;
a failure of an MCG-side synchronization reconfiguration;
a failure of an Inter-RAT handover from new radio (NR);
a failure of lower-layer PDCP integrity protection and verification corresponding to an SRB1 or an SRB2;

a failure of a radio resource control (RRC) reconfiguration procedure.

19. The terminal according to claim 17, wherein the MCG abnormality information further comprises at least one of:
an MCG abnormality cause;
a measurement result of an MCG-side serving cell when the MCG is abnormal;
a measurement result of a neighboring cell obtained based on an MCG measurement configuration when the MCG is abnormal;
wherein the measurement result comprises a cell-level measurement result and/or a beam-level measurement result.

\* \* \* \* \*